Jan. 22, 1924.
E. S. GARDINER
APPARATUS FOR MAKING DRIP COFFEE.
Filed Dec. 14, 1922
1,481,258
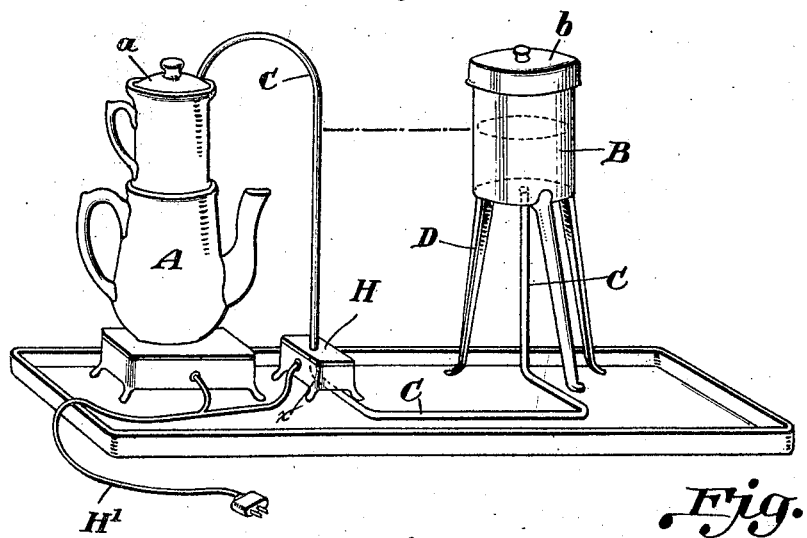
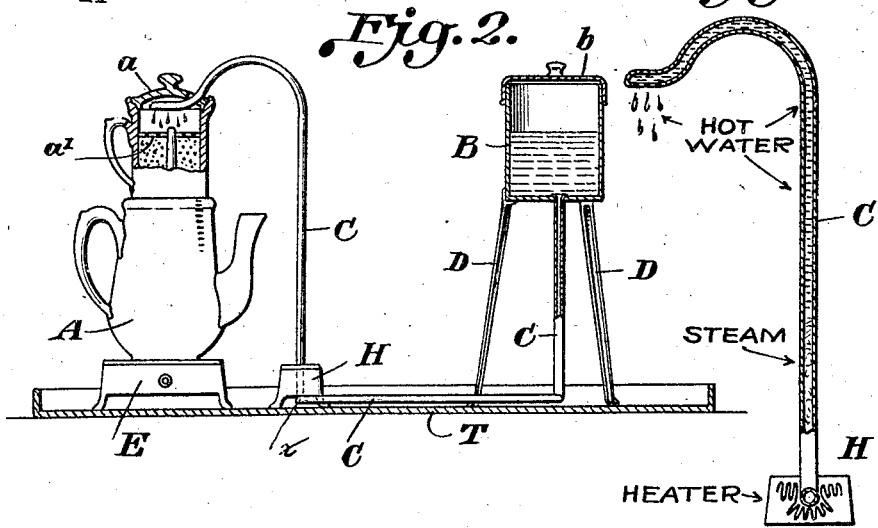
Inventor
Edwin S. Gardiner
by his Attorneys
Baldwin Wight Patented Jan. 22, 1924.

1,481,258

UNITED STATES PATENT OFFICE.

EDWIN SAMUEL GARDINER, OF NEW ORLEANS, LOUISIANA.

APPARATUS FOR MAKING DRIP COFFEE.

Application filed December 14, 1922. Serial No. 606,895.

*To all whom it may concern:*

Be it known that I, EDWIN S. GARDINER, a citizen of the United States, residing in New Orleans, in the parish of Orleans and State of Louisiana, have invented certain new and useful Improvements in Apparatus for Making Drip Coffee, of which the following is a specification.

This invention relates to apparatus for making coffee of the kind produced by causing boiling water to pass through a mass of ground or cut coffee held in the upper part of a pot, urn, or other suitable receptacle. My U. S. Patent No. 1,418,436 of June 6, 1922 shows a coffee pot suitably constructed for making coffee of this kind which, as is well known, is superior to coffee infusions made in percolaters.

In making drip coffee the best results have been obtained by repeatedly pouring small quantities of boiling water or milk on the mass of ground coffee instead of by supplying a large quantity of the liquid thereto at any one time as by doing so tannin is extracted from the ground coffee which, of course, is undesirable. Those who take the pains to make coffee in this way obtain a superior quality of coffee, but many persons will not take this trouble and are satisfied with inferior results.

According to my present invention I provide means whereby relatively small quantities of the liquid are automatically supplied at regular intervals from a reservoir to the pot or other suitable receptacle.

While drip coffee according to my invention may be made in various kinds of receptacles I will herein for sake of convenience show my improvements applied to a coffee pot and will hereinafter refer to the receptacle as a pot.

In carrying out my invention I use a suitable receptacle such as an ordinary drip coffee pot of the kind shown in my patent above mentioned, or I may use an urn or other such receptacle. Means is provided for holding the ground or cut coffee in the upper part of the receptacle, and suitable provision is made for allowing the liquid after passing through the coffee to be collected in the lower portion of the receptacle. In order to supply the coffee receptacle with the required liquid, such as water or milk, I provide a liquid reservoir which is held at an elevation corresponding with the upper part of the pot and I connect this reservoir with the pot by a pipe which extends downwardly from the reservoir, is suitably bent and then extended upwardly to the top of the pot where it delivers the liquid at suitable intervals and in proper quantities. Just above the lower bend of the pipe I supply a heater of any suitable kind to cause the liquid in the pipe adjacent the heater to boil. I have found that it is possible to cause a relatively small part of the liquid above the heater to thus boil and this results in a pressure on the column of liquid above the heater which causes this portion of the liquid to be raised and delivered to the coffee pot. This operation is quickly performed and after this measured quantity of liquid is thus delivered liquid from the reservoir will pass through the lower portion of the pipe past the heater and will fill the pipe to a predetermined level. After a certain interval the water again boils, and another measured quantity of liquid is delivered to the pot. Such operation is continued until the desired quantity of coffee infusion is obtained.

In order to keep the coffee in the pot hot or at the desired temperature without boiling it, I provide a heater on which the coffee pot rests.

In the accompanying drawing—

Figure 1 is a perspective view of an apparatus for making drip coffee embodying my invention.

Figure 2 is a view partly in elevation and partly in section of this apparatus.

Figure 3 is a detail sectional view of the liquid delivery pipe and illustrates how the liquid is heated to cause it to boil and to deliver measured quantities to the pot.

A coffee pot of suitable construction is indicated at A, but it will be understood that urns or other receptacles may be used. The pot shown is provided with a cover $a$ and with a receptacle for the ground or cut coffee which is preferably held in place by a perforated disc $a'$.

In order to automatically supply the pot with a suitable liquid I provide a reservoir B having a cover $b$ and held at a suitable elevation by standards D. The apparatus may be supported on a suitable tray T, as shown, although this is not essential. The reservoir B is connected with the upper part of the pot by a supply pipe C which extends downwardly from the bottom of the reservoir and has a horizontally arranged lower portion extending across the tray and then the pipe is bent and continued upwardly to a plane above the reservoir, its upper end being curved and extended through a hole in the top of the cover $a$. The inner end of the pipe is preferably perforated, as shown, so that the liquid may be delivered slowly and over an extended surface to the coffee.

It will be observed that the liquid level in the reservoir B is at all times below the curved top of the pipe C and therefore there can be no syphoning of the liquid in the reservoir.

In order to boil the liquid, I employ a heater H of any suitable kind such as an electrical heater, the supply wires of which are indicated at H'. The heater is applied to the pipe just above the bend $x$ thereof.

By means of the heater, the liquid in the pipe adjacent the heater is caused to boil and produce pressure on that part of the liquid above it so that this liquid in the upper part of the pipe is forced through the delivery end thereof into the pot. This operation causes liquid to flow from all that portion of the pipe immediately below the level of the reservoir and as soon as the boiling operation is thus suspended or the pressure is reduced by the discharge of the liquid into the coffee pot the liquid level will be renewed in the pipe C and will remain there until more water is boiled by the heater when the operation is repeated. This operation may be continued indefinitely as long as the heater is in operation and as the reservoir contains liquid, but of course the operation is suspended as soon as a sufficient quantity of the coffee infusion is obtained in the pot. Actual demonstration has shown that by employing a pipe of suitable length and of suitable cross section or by varying the length and the cross section the amount of liquid delivered to the pot at each step of the operation may be controlled and I may also control in the same way the periods of such delivery.

It will be observed that the heater is applied to the pipe itself, which pipe has a relatively small bore. The same results could not be obtained by heating the reservoir B or by heating a similar receptacle of large dimensions. The effect of intermittent delivery of liquid to the pot is due to the fact that the water is made to boil in a pipe having a relatively small bore or an area which is relatively small compared with the area of a reservoir or similar container. It will be observed that the upper curved end of the pipe C is so connected with the cover $a$ that the cover can be readily removed when desired.

It is desirable, of course, to keep the coffee infusion hot after it is made and therefore I preferably employ a heater E on which the pot rests. This heater should be of such construction that it will not make the infusion boil. The heat is preferably maintained just below the boiling point.

I claim as my invention:

1. Apparatus for making drip coffee, comprising a coffee pot, a coffee receptacle delivering thereto, a liquid reservoir outside the pot, a pipe extending from the reservoir to the upper part of the coffee receptacle and delivering thereto, and a heater outside the pot applied to the supply pipe between the reservoir and the receptacle.

2. Apparatus for making drip coffee, comprising a coffee receptacle, a liquid reservoir and a pipe extending downwardly from the reservoir and then upwardly to the receptacle, and a heater applied to the upwardly extending portion of the pipe.

3. Apparatus for making drip coffee, comprising a coffee receptacle, a liquid reservoir, a pipe having a restricted bore and extending downwardly from the reservoir and then upwardly to the coffee receptacle, and a heater applied to the pipe and surrounding the restricted bore thereof.

4. Apparatus for making drip coffee, comprising a coffee receptacle, a liquid reservoir supported on a level corresponding with the level of the upper portion of the coffee receptacle, a pipe having a restricted bore extending from the reservoir to the upper part of the coffee receptacle and delivering thereto, and a heater applied to said pipe and surrounding the restricted bore thereof.

5. Apparatus for making drip coffee, comprising a coffee pot, a coffee receptacle delivering thereto, a liquid reservoir outside the pot, a pipe extending from the reservoir to the upper part of the coffee receptacle and delivering thereto, a heater outside the pot applied to the delivery pipe between the reservoir and the coffee receptacle, and a heater on which the coffee receptacle rests during the operation.

In testimony whereof, I have hereunto subscribed my name.

EDWIN SAMUEL GARDINER.